(12) United States Patent
Ohno et al.

(10) Patent No.: US 7,972,407 B2
(45) Date of Patent: Jul. 5, 2011

(54) HONEYCOMB STRUCTURE, EXHAUST GAS CLEANING UNIT, AND MANUFACTURING METHOD OF HONEYCOMB STRUCTURE

(75) Inventors: Kazushige Ohno, Gifu (JP); Masafumi Kunieda, Gifu (JP); Takahiko Ido, Gifu (JP)

(73) Assignee: Ibiden Co., Ltd., Ogaki-shi (JP)

( * ) Notice: Subject to any disclaimer, the term of this patent is extended or adjusted under 35 U.S.C. 154(b) by 329 days.

(21) Appl. No.: 12/362,310

(22) Filed: Jan. 29, 2009

(65) Prior Publication Data
US 2009/0291032 A1 Nov. 26, 2009

(30) Foreign Application Priority Data

May 20, 2008 (JP) .................. PCT/JP2008/059283

(51) Int. Cl.
*B01D 39/06* (2006.01)
*B01D 39/14* (2006.01)
*B01D 24/00* (2006.01)
*B01D 50/00* (2006.01)

(52) U.S. Cl. .............. 55/523; 55/522; 55/524; 422/169; 422/170; 422/171; 422/172; 422/177; 422/178; 422/179; 422/180; 422/181; 422/182

(58) Field of Classification Search ............ 55/522–524; 422/169–172, 177–182
See application file for complete search history.

(56) References Cited

U.S. PATENT DOCUMENTS

| | | | |
|---|---|---|---|
| 6,916,450 B2 * | 7/2005 | Akama et al. ................. 422/180 |
| 2005/0031514 A1 * | 2/2005 | Patchett et al. ............ 423/239.2 |
| 2005/0095395 A1 * | 5/2005 | Miwa .......................... 428/116 |
| 2006/0228519 A1 * | 10/2006 | Kato ........................... 428/116 |
| 2006/0292337 A1 | 12/2006 | Ohno et al. |
| 2007/0259770 A1 | 11/2007 | Hofmann et al. |
| 2008/0102146 A1 | 5/2008 | Yamazaki |
| 2008/0292519 A1 * | 11/2008 | Caudle et al. ................. 423/237 |

FOREIGN PATENT DOCUMENTS
EP 0449556 10/1991
(Continued)

OTHER PUBLICATIONS

Joerg Muench et al., "Extruded Zeolite Based Honeycomb Catalyst for NOx Removal from Diesel Exhaust", SAE International, 2008, pp. 443-450, XP009125783.

(Continued)

*Primary Examiner* — Walter D Griffin
*Assistant Examiner* — Amber Orlando
(74) *Attorney, Agent, or Firm* — Ditthavong Mori & Steiner, P.C.

(57) ABSTRACT

A honeycomb structure includes an inorganic particle, inorganic binder, a honeycomb unit, a first end face, and a second end face. The honeycomb unit includes plural partition walls extending along a longitudinal direction of the honeycomb unit to define through-holes. The first end face is substantially perpendicular to the longitudinal direction and provided at a first end of the honeycomb structure. The second end face is substantially perpendicular to the longitudinal direction and provided at a second end opposite to the first end in the longitudinal direction of the honeycomb structure. First circularity of the first end face and second circularity of the second end face are about 1.5 mm to about 4.0 mm. The circularity of the first end face is different from the circularity of the second end face.

42 Claims, 4 Drawing Sheets

FOREIGN PATENT DOCUMENTS

| | | |
|---|---|---|
| EP | 1489278 | 12/2004 |
| EP | 1736223 | 12/2006 |
| EP | 1857427 | 11/2007 |
| JP | 06-170241 | 6/1994 |
| JP | 07-132230 | 5/1995 |
| JP | 2003-262118 | 9/2003 |
| JP | 2007-054822 | 3/2007 |
| JP | 2008-114414 | 5/2008 |
| WO | WO 2006/137160 | 12/2006 |
| WO | WO 2009/022015 | 2/2009 |

OTHER PUBLICATIONS

Korean Office Action for corresponding KR Application No. 10-2009-7018047, Apr. 7, 2011.

* cited by examiner

HONEYCOMB STRUCTURE, EXHAUST GAS CLEANING UNIT, AND MANUFACTURING METHOD OF HONEYCOMB STRUCTURE

CROSS-REFERENCE TO RELATED APPLICATION

The present application claims priority under 35 U.S.C §119 to International Application No. PCT/JP2008/059283, filed May 20, 2008, the entire contents of which are incorporated herein by reference.

BACKGROUND OF THE INVENTION

1. Field of the Invention

The present invention relates to a honeycomb structure, an exhaust gas cleaning unit, and a manufacturing method of the honeycomb structure.

2. Description of the Related Art

Conventionally, various techniques have been developed to clean vehicle exhaust gas, however, sufficient countermeasures have not been taken for the increasing traffic. Emission restrictions will become tighter not only in Japan but all over the world. In particular, a restriction of NOx in diesel exhaust gas is becoming very strict. A conventional method to reduce NOx by controlling an engine combustion system is not sufficient anymore. As a diesel NOx cleaning system for such problems, there is a NOx reduction system (called an SCR system) using ammonia as a reducing agent. Moreover, zeolite is known as a material to adsorb the ammonia used in the SCR system.

International Publication No. 06/137160 discloses a honeycomb structure having a honeycomb unit including a ceramic particle, and an inorganic fiber and/or a whisker, with a cross-sectional area of 5 to 50 cm$^2$ vertical to a longitudinal direction of the honeycomb unit and circularity of 1.0 to 2.5 mm of the cross-section vertical to the longitudinal direction of the honeycomb unit. In this case, one or more ceramic selected from alumina, silica, zirconia, titania, ceria, mullite, and zeolite is employed as an example.

Note that a honeycomb structure which has a retention seal over an outer surface and is housed in a metal container formed of stainless steel or the like is used as an exhaust gas cleaning unit in general.

The entire contents of International Publication No. 06/137160 are incorporated herein by reference.

SUMMARY OF THE INVENTION

According to one aspect of the present invention, a honeycomb structure includes an inorganic particle, inorganic binder, a honeycomb unit, a first end face, and a second end face. The honeycomb unit includes plural partition walls extending along a longitudinal direction of the honeycomb unit to define through-holes. The first end face is substantially perpendicular to the longitudinal direction and provided at a first end of the honeycomb structure. The second end face is substantially perpendicular to the longitudinal direction and provided at a second end opposite to the first end in the longitudinal direction of the honeycomb structure. First circularity of the first end face and second circularity of the second end face are about 1.5 mm to about 4.0 mm. The circularity of the first end face is different from the circularity of the second end face.

According to another aspect of the present invention, an exhaust gas cleaning unit includes a honeycomb structure. The honeycomb structure includes an inorganic particle, inorganic binder, a honeycomb unit, a first end face, and a second end face. The honeycomb unit includes plural partition walls extending along a longitudinal direction of the honeycomb unit to define through-holes. The first end face is substantially perpendicular to the longitudinal direction and provided at a first end of the honeycomb structure. The second end face is substantially perpendicular to the longitudinal direction and provided at a second end opposite to the first end in the longitudinal direction of the honeycomb structure. First circularity of the first end face and second circularity of the second end face are about 1.5 mm to about 4.0 mm. The circularity of the first end face is different from the circularity of the second end face. A holding sealing material is provided around an outer surface of the honeycomb structure. The honeycomb structure provided with the holding sealing material is provided in a metal container.

According to another aspect of the present invention, a manufacturing method of honeycomb structure includes extruding a raw material paste including the organic particle and the inorganic binder to form a raw honeycomb molded body. The honeycomb structure includes a honeycomb unit including plural partition walls extending along a longitudinal direction of the honeycomb structure to define through-holes. The raw honeycomb molded body is dried. The raw honeycomb molded body is degreased. The raw honeycomb molded body is fired. A first end face substantially perpendicular to the longitudinal direction is provided at a first end of the honeycomb structure. A second end face substantially perpendicular to the longitudinal direction is provided at a second end opposite to the first end in the longitudinal direction. First circularity of the first end face and second circularity of the second end face are about 1.5 mm to about 4.0 mm. The circularity of the first end face is different from the circularity of the second end face.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Figure 1A:
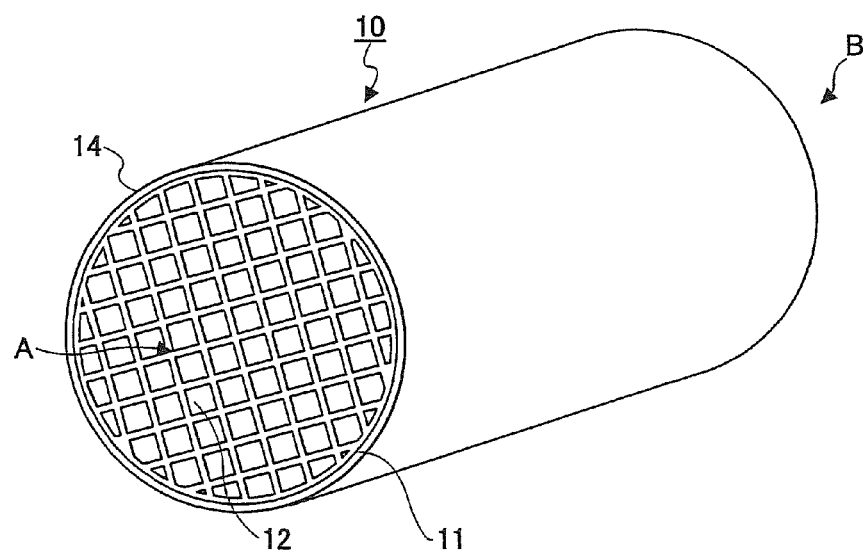
FIG. 1A is a perspective view showing an example of a honeycomb structure of an embodiment of the present invention.

Embodiments will now be described with reference to the accompanying drawings, wherein like reference numerals designate corresponding or identical elements throughout the various drawings.

Figure 1B:
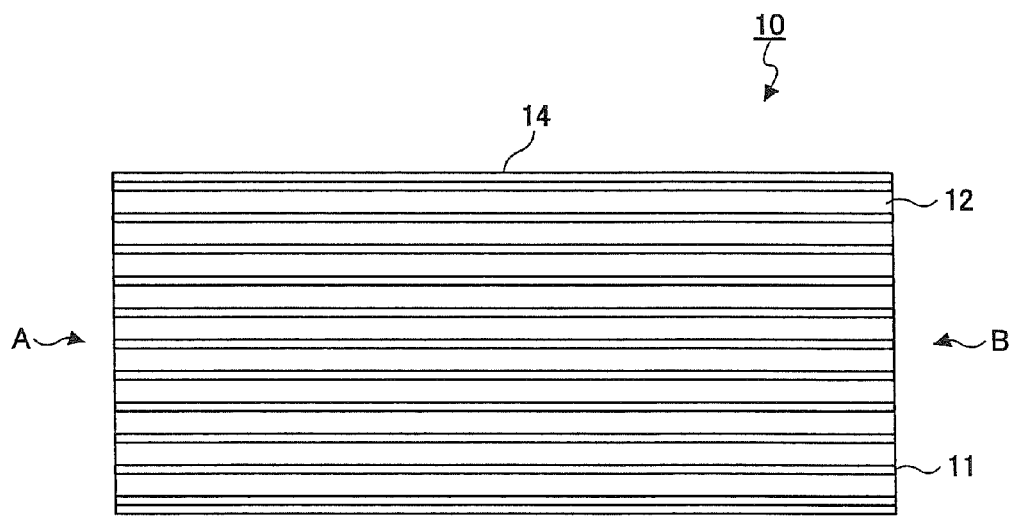
FIG. 1B is a cross-sectional view in a longitudinal direction of the honeycomb structure of FIG. 1A.

FIGS. 1A and 1B show examples of the honeycomb structure of the embodiment of the present invention. A honeycomb structure 10 in a cylindrical shape includes zeolite and inorganic binder. An outer coating layer 14 is formed over an outer surface of a single honeycomb unit 11 having plural through-holes 12 arranged in parallel with each other in the longitudinal direction with partition walls interposed therebetween. At this time, an end face A and an end face B which are almost vertical to the longitudinal direction have a circularity of about 1.5 mm to about 4.0 mm. The circularity of the end face A is different from the circularity of the end face B. Therefore, when the honeycomb structure 10 is housed in a metal container, it becomes easier to suppress displacement of the honeycomb structure 10 from the metal container. When the circularity of the end faces A and/or B is equal to or more than about 1.5 mm, displacement of the honeycomb structure 10 from the metal container can be easily suppressed. When the circularity of the end faces A and/or B is equal to or less than about 4.0 mm, a pressure is not easily concentrated in a part with a large circularity when housing the honeycomb structure in the metal container. Thus, the honeycomb structure is not easily broken.

Further, it is preferable that a difference (absolute value) in circularity between the end faces A and B be about 1.0 mm to about 2.0 mm. When the difference in the circularity of the end faces A and B is equal to or more than about 1.0 mm, it becomes easier to suppress displacement of the honeycomb structure 10 from the metal container when the honeycomb structure 10 is housed in the metal container. When the difference in circularity of the end faces A and B is equal to or less than about 4.0 mm, manufacture of the honeycomb structure 10 does tend to be difficult.

Vertical cross-sections of other parts of the honeycomb structure 10 other than the end faces A and B are preferably in an almost perfect circle for the ease of manufacture. Such honeycomb structure 10 can be manufactured by changing the circularity of the end faces A and B of the honeycomb structure having cross-sections vertical to the longitudinal direction in an almost perfect circle. Moreover, the honeycomb structure 10 may have one or more parts where a cross-section vertical to the longitudinal direction has large circularity, other than the end faces A and B.

Note that the circularity is a degree of displacement from a geometric circle of a circular form, which is expressed by a minimum difference in radius between two geometric circles which sandwich the circular form. The circularity can be automatically measured by a laser measuring instrument, a gage measuring instrument, an optical measuring instrument which emits parallel white light, a digital vernier caliper, and the like.

The honeycomb unit 11 preferably includes zeolite of about 230 g/L to about 270 g/L per apparent unit volume. When the content of zeolite per apparent unit volume is equal to or more than about 230 g/L, an apparent volume of the honeycomb unit 11 is not required to be increased to obtain a sufficient NOx cleaning ratio. When the content of zeolite is equal to or less than about 270 g/L, the strength of the honeycomb unit 11 does not tend to be insufficient.

Zeolite to be used is not particularly limited, but β-type zeolite, ZSM-5-type zeolite, mordenite, faujasite, zeolite A, zeolite L, and the like can be used alone or in combination.

Further, it is preferable that a mole ratio of silica to alumina in zeolite be from about 30 to about 50.

Furthermore, zeolite may be ion-exchanged to increase an adsorption capacity of ammonia. A cationic species to be ion-exchanged is not particularly limited, but Fe, Cu, Ni, Co, Zn, Mn, Ti. AG, V, and the like can be selected alone or in combination. It is preferable that the ion-exchange amount be about 1.0 weight % to about 10.0 weight %, and more preferably about 1.0 weight % to about 5.0 weight %. When the ion-exchange amount is equal to or more than about 1.0 weight %, the adsorption capacity of ammonia does not tend to be insufficient. When the ion-exchange amount is equal to or less than about 10.0 weight %, zeolite does not easily become structurally instable when heat is applied thereto. When exchanging ions of zeolite, zeolite is to be impregnated with an aqueous solution including a cation.

Moreover, it is preferable that zeolite include secondary particles with an average particle diameter of about 0.5 μm to about 10 μm. When the average particle diameter of the secondary particles of zeolite is equal to or more than about 0.5 μm, a large amount of inorganic binder is not required to be added. As a result, extrusion molding does not tend to be difficult. When the average particle diameter of the secondary particles of zeolite is equal to or less than about 10 μm, a specific surface of zeolite does not tend to be reduced. As a result, the NOx cleaning ratio does not tend to be reduced.

To improve the strength, the honeycomb unit 11 may further include inorganic particles other than zeolite. The inorganic particles other than zeolite are not particularly limited, but alumina, silica, titania, zirconia, ceria, mullite, these precursors, and the like can be used alone or in combination. Among these, alumina and zirconia are particularly preferable.

It is preferable that the inorganic particles other than zeolite have an average particle diameter of about 0.5 μm to about 10 μm. When the average particle diameter is equal to or more than about 0.5 μm, a large amount of inorganic binder is not required to be added. As a result, extrusion molding does not tend to be difficult. When the average particle diameter is equal to or less than about 10 μm, an effect to improve the strength of the honeycomb unit 11 does not tend to be insufficient. Note that the inorganic particles other than zeolite may include secondary particles.

It is preferable that a ratio of an average particle diameter of the secondary particles of the inorganic particles other than zeolite to an average particle ratio of the secondary particles of zeolite be about 1 or less, and more preferably about 0.1 to about 1. When this ratio is equal to or less than about 1, an effect to improve the strength of the honeycomb unit 11 does not tend to be insufficient.

It is preferable that the honeycomb unit 11 include about 3 weight % to about 30 weight %, and more preferably about 5 weight % to about 20 weight % of the inorganic particles other than zeolite. When this content is equal to or more than about 3 weight %, an effect to improve the strength of the honeycomb unit 11 does not tend to be insufficient. When this content is equal to or less than about 30 weight %, the content of zeolite in the honeycomb unit 11 does not tend to be reduced. As a result, the NOx cleaning ratio is not easily reduced.

The inorganic binder is not particularly limited, but a solid matter included in alumina sol, silica sol, titania sol, liquid glass, sepiolite, attapulgite, and the like can be used alone or in combination.

It is preferable that the honeycomb unit 11 include about 5 weight % to about 30 weight %, and more preferably about 10 weight % to about 20 weight % of inorganic binder. When the content of inorganic binder is equal to or more than about 5 weight %, the strength of the honeycomb unit 11 does not tend to be reduced. When the content of inorganic binder is equal to or less than about 30 weight %, molding of the honeycomb unit 11 does not tend to be difficult.

It is preferable that the honeycomb unit 11 further include an inorganic fiber to improve the strength.

The inorganic fiber is not particularly limited as long as the strength of the honeycomb unit 11 is improved. One or more of alumina, silica, silicon carbide, silica alumina, glass, potassium titanate, aluminum borate, and the like can be used.

It is preferable that the inorganic fiber have an aspect ratio of about 2 to about 1000, more preferably about 5 to about 800, and further more preferably about 10 to about 500. When the aspect ratio is equal to or more than about 2, an effect to improve the strength of the honeycomb unit 11 does not tend to be insufficient. When the aspect ratio is equal to or less than about 1000, on the other hand, a molding die is not easily clogged when molding the honeycomb structure. Further, the inorganic fiber is not easily broken in the case of molding. As a result, an effect to improve the strength of the honeycomb unit 11 does not tend to be insufficient.

It is preferable that the honeycomb unit 11 include about 3 weight % to about 50 weight %, more preferably about 3 weight % to about 30 weight %, and further more preferably about 5 weight % to about 20 weight % of the inorganic fiber. When the content of the inorganic fiber is equal to or more than about 3 weight %, an effect to improve the strength of the honeycomb unit 11 does not tend to be insufficient. When the content of the inorganic fiber is equal to or less than about 50 weight %, the content of zeolite in the honeycomb unit 11 is not easily reduced. As a result, the NOx cleaning ratio is not easily reduced.

It is preferable that an aperture ratio of a cross-section of the honeycomb unit 11 vertical to a longitudinal direction be about 50% to about 65%. When the aperture ratio is equal to or more than about 50%, zeolite tends to be effectively used to clean NOx. When the aperture ratio is equal to or less than about 65%, the strength of the honeycomb structure 10 does not tend to become insufficient.

It is preferable that a density of through-holes 12 in a cross-section vertical to the longitudinal direction of the honeycomb unit 11 be about 15.5 holes/cm$^2$ to about 124 holes/cm$^2$, or more preferably about 31 holes/cm$^2$ to about 93 holes/cm$^2$. When the density of the through-holes 12 is equal to or more than about 15.5 holes/cm$^2$, it becomes easier for an exhaust gas and zeolite to contact with each other. As a result, the NOx cleaning ability of the honeycomb unit 11 is not easily reduced. When the density of the through-holes 12 is equal to or less than about 124 holes/cm$^2$, a pressure loss of the honeycomb unit 11 is not easily increased.

It is preferable that the partition walls between the through-holes 12 of the honeycomb unit 11 be about 0.10 mm to about 0.50 mm in thickness, or more preferably about 0.15 mm to about 0.35 mm in thickness. When the thickness of the partition wall is equal to or more than about 0.10 mm, the strength of the honeycomb unit 11 is not easily reduced. When the thickness of the partition wall is equal to or less than about 0.50 mm, it becomes easier for the exhaust gas to be penetrated deep enough into the partition wall. Thus, zeolite tends to be effectively used to clean NOx.

It is preferable that the outer coating layer 14 have a thickness of about 0.1 mm to about 2 mm. When the thickness of the outer coating layer 14 is equal to or more than about 0.1 mm, an effect to improve the strength of the honeycomb structure 10 does not tend to be insufficient. When the thickness of the outer coating layer 14 is equal to or less than about 2 mm, the content of zeolite per unit volume of the honeycomb structure 10 does not tend to be reduced. As a result, the NOx cleaning ability of the honeycomb structure 10 is not easily reduced.

The through-holes 12 have a shape of a rectangular pillar, however, the shape of the through-holes of the embodiment of the present invention is not particularly limited. The through-holes may be in a triangular pillar shape, a hexagonal pillar shape, or the like.

Next, an example of a manufacturing method of the honeycomb structure 10 is described. First, a raw material paste including zeolite, inorganic binder, and if desired further including an inorganic particle other than zeolite, an inorganic fiber, and the like is molded by extrusion molding and the like. Thus, a raw honeycomb molded body having plural through-holes arranged in parallel to each other in the longitudinal direction, with partition walls interposed therebetween, is formed. As a result, the honeycomb unit 11 in a cylindrical shape with sufficient strength can be obtained even with a low firing temperature.

Alumina sol, silica sol, titania sol, liquid glass, sepiolite, attapulgite, or the like is added as the inorganic binder alone or in combination in the raw material paste.

Organic binder, a dispersion medium, a forming aid, and the like may be added into the raw material paste as required.

The organic binder is not particularly limited, but methyl cellulose, carboxymethyl cellulose, hydroxyethyl cellulose, polyethylene glycol, a phenol resin, an epoxy resin, and the like can be used alone or in combination. Note that the amount of organic binder to be added is preferably about 1% to about 10% with respect to the total amount of zeolite, the inorganic particle other than zeolite, the inorganic fiber, and inorganic binder.

The dispersion medium is not particularly limited, but water, an organic solvent such as benzene, an alcohol such as methanol, and the like can be used alone or in combination.

The forming aid is not particularly limited, but ethylene glycol, dextrin, fatty acid, fatty acid soap, polyalcohol, and the like can be used alone or in combination.

The raw material paste is preferably formed by mixing and kneading materials. A mixer, an attritor, and the like may be used to mix the materials and a kneader and the like may be used to knead the materials.

Next, the honeycomb molded body is dried by using a drying apparatus such as a microwave drying apparatus, a hot air drying apparatus, a dielectric drying apparatus, a decompression drying apparatus, a vacuum drying apparatus, and a freeze drying apparatus.

The honeycomb molded body is then degreased. Conditions of the degreasing are not particularly limited, but it is preferable to degrease the honeycomb molded body at about 400° C. for about two hours though depending on the kind and amount of an organic matter included in the honeycomb molded body.

Further, by firing the honeycomb molded body, the honeycomb unit 11 in a cylindrical shape is obtained. It is preferable that the firing temperature be about 600° C. to about 1200° C., and more preferably about 600° C. to about 1000° C. When the firing temperature is equal to or more than about 600° C., sintering is facilitated, therefore, the strength of the honeycomb unit is not easily reduced. With the firing temperature of equal to or less than about 1200° C., reactive sites of zeolite are not easily decreased since the sintering does not proceed too much.

By applying pressure or polishing the external wall of the honeycomb unit 11 after drying, degreasing, or firing, the circularity of the end faces A and B of the honeycomb structure 10 can be changed.

Subsequently, an outer coating layer paste is applied over an outer surface of the honeycomb unit 11 in the cylindrical shape. The outer coating layer paste is not particularly limited, but a mixture of inorganic binder and an inorganic particle, a mixture of inorganic binder and an inorganic fiber, a mixture of inorganic binder, an inorganic particle, and an inorganic fiber, and the like are suggested.

The outer coating layer paste may include organic binder. The organic binder is not particularly limited, but one or more of polyvinyl alcohol, methyl cellulose, ethyl cellulose, carboxymethyl cellulose, and the like can be used.

Next, by drying and solidifying the honeycomb unit 11 over which the outer coating layer paste is applied, the honeycomb structure 10 in a cylindrical shape is obtained. In this case, the honeycomb structure is preferably degreased when the outer coating layer paste includes organic binder. Conditions of degreasing can be selected depending on the kind and amount of an included organic matter, but it is preferable that the degreasing is performed at about 700° C. for about 20 minutes.

By forming the outer coating layer 14 with a changing thickness instead of a uniform thickness, the circularity of the end faces A and B of the honeycomb unit 10 can be changed. As methods to change the thickness of the outer coating layer 14, there are a method to change the thickness when applying the outer coating layer 14, a method to apply pressure to the outer coating layer 14 after the application, a method to polish the outer coating layer 14 after drying and solidification, and the like.

Figure 2A:
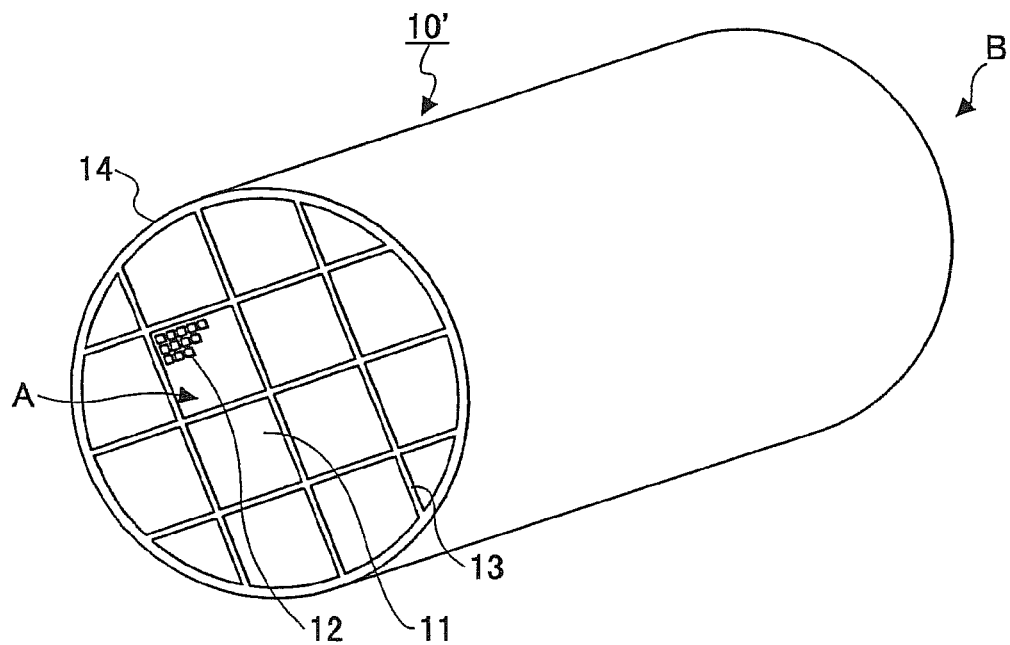
FIG. 2A is a perpendicular view showing another example of a honeycomb structure of an embodiment of the present invention.
Figure 2B:
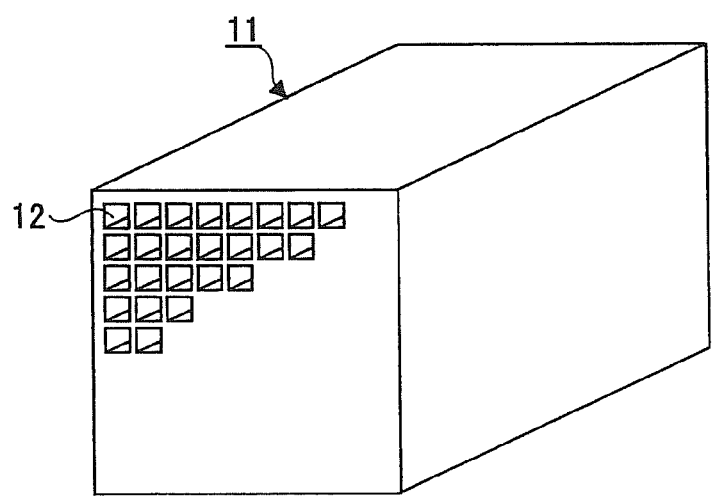
FIG. 2B is a perpendicular view showing the honeycomb unit in FIG. 2A.

FIGS. 2A and 2B show other examples of the honeycomb structure of the embodiment of the present invention. A honeycomb structure 10' is similar to the honeycomb unit 10 except that the plural honeycomb units 11, each of which has plural through-holes 12 arranged in parallel to each other in the longitudinal direction, with the partition walls interposed therebetween, are adhered to each other with an adhesion layer 13 interposed therebetween.

It is preferable that a cross-sectional area vertical to the longitudinal direction of the honeycomb unit 11 be about 5 $cm^2$ to about 50 $cm^2$. When the cross-sectional area is equal to or more than about 5 $cm^2$, a specific surface area of the honeycomb structure 10 does not tend to be reduced and a pressure loss is not easily increased. When the cross-sectional area is equal to or less than about 50 $cm^2$, strength against a generated thermal stress of the honeycomb unit 11 does not tend to be insufficient.

It is preferable that the adhesion layer 13 to adhere the honeycomb units 11 have a thickness of about 0.5 mm to about 2 mm. When the thickness of the adhesion layer 13 is equal to or more than about 0.5 mm, an adhesion force does not tend to be insufficient. When the thickness of the adhesion layer 13 is equal to or less than about 2 mm, a specific surface area of the honeycomb structure 10 does not tend to be reduced and a pressure loss is not easily increased.

The honeycomb unit 11 is in a rectangular pillar shape, however, the shape of the honeycomb unit is not particularly limited in the embodiment of the present invention as long as the honeycomb units can be easily adhered. For example, the honeycomb unit may be in a hexagonal pillar shape and the like.

Next, an example of a manufacturing method of the honeycomb structure 10' is described. First, the honeycomb unit 11 in a rectangular pillar shape is formed similarly to the honeycomb structure 10. Then, after an adhesion layer paste is applied to an outer surface of the honeycomb unit 11, the honeycomb units 11 are sequentially adhered to each other. Through drying and solidification, an assembly of the honeycomb units 11 is formed. At this time, the assembly of the honeycomb units 11 may be cut and polished to be in a cylindrical shape. Moreover, the honeycomb units 11 with a cross-section formed in a sector shape or a square shape may be adhered to each other to form a cylindrical assembly of the honeycomb units 11.

The adhesion layer paste is not particularly limited, but a mixture of inorganic binder and inorganic particles, a mixture of inorganic binder and inorganic fiber, a mixture of inorganic binder, inorganic particles, and inorganic fiber, and the like can be used.

Further, the adhesion layer paste may include organic binder. The organic binder is not particularly limited, but one or more of polyvinyl alcohol, methyl cellulose, ethyl cellulose, carboxymethyl cellulose, and the like can be used.

By polishing an outer wall of the cylindrical assembly of the honeycomb units 11, circularity of the end faces A and B of the honeycomb structure 10 can be changed.

Next, an outer coating layer paste is applied to an outer surface of the cylindrical assembly of the honeycomb units 11. The outer coating layer paste is not particularly limited, but the same material or a different material from the adhesion layer paste may be included. Moreover, the outer coating layer paste may have the same composition as the adhesion layer paste.

Subsequently, by drying and solidifying the assembly of the honeycomb units 11 having the outer coating layer paste applied, the honeycomb structure 10' in a cylindrical shape is obtained. When the adhesion layer paste and/or the outer coating layer paste include organic binder, the honeycomb structure 10' is preferably degreased. Conditions for the degreasing can be appropriately selected depending on the kind and amount of an included organic matter, however, the degreasing is preferably performed at about 700° C. for about 20 minutes.

The honeycomb structures 10 and 10' may be formed of a raw material paste including zeolite which is not ion-exchanged and then zeolite may be ion-exchanged by impregnating the honeycomb structure with an aqueous solution including a cation.

The honeycomb structure of the embodiment of the present invention does not necessarily have the outer coating layer. However, it is preferable that the outer coating layer be formed for the ease of changing the circularity of the end faces.

Figure 3:
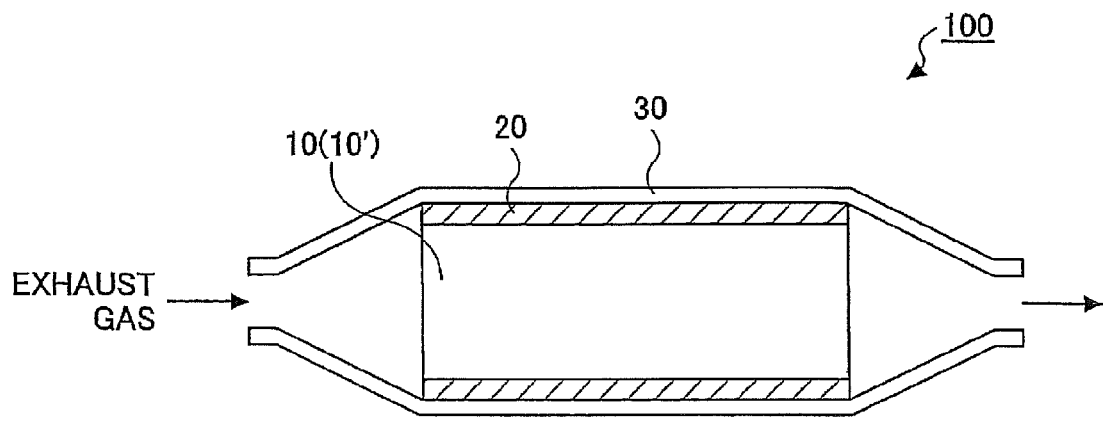
FIG. 3 is a cross-sectional view showing the exhaust gas cleaning unit of an embodiment of the present invention.

FIG. 3 shows an example of an exhaust gas cleaning unit of the embodiment of the present invention. In an exhaust gas cleaning unit 100, the honeycomb structure 10 (10') having a holding sealing material 20 such as an alumina mat provided around the outer surface is stored in a metal container 30. Therefore, it becomes easier to suppress displacement of the honeycomb structure 10 (10') from the metal container in the exhaust gas cleaning unit 100.

Moreover, in the exhaust gas cleaning unit 100, a spray unit (not shown) such as a spray nozzle to spray ammonia or its precursor is provided upstream of the exhaust gas flow in the honeycomb structure 10 (10'). As a result, ammonia is added to the exhaust gas and NOx included in the exhaust gas is reduced in zeolite included in the honeycomb structure 10 (10'). When the storage stability is considered, it is preferable to use a urea aqueous solution as the precursor of ammonia. When heated in the exhaust gas, the urea aqueous solution is hydrolyzed and generates ammonia.

Heretofore, a honeycomb structure including zeolite as an inorganic particle and a honeycomb structure including zeolite and an inorganic particle other than zeolite are described. Similar effects are also expected in a honeycomb structure including only the inorganic particle other than zeolite.

When forming a conventional honeycomb structure with a large surface area to improve the NOx cleaning performance by extruding a material including zeolite, the honeycomb structure tends to have low strength since the honeycomb structure cannot be sufficiently calcined. Therefore, in some cases, a high pressure cannot be applied to house the honeycomb structure in the metal container when manufacturing an exhaust gas cleaning unit. As a result, there is a problem that the honeycomb structure displaces from the metal container due to an exhaust pressure, vibration, and the like when using the exhaust gas cleaning unit in a vehicle or the like.

According to the embodiment of the present invention, a honeycomb structure which does not easily displace from the metal container and an exhaust gas cleaning unit having the honeycomb structure can be formed.

EXAMPLES

Example 1

First, 2600 g of β-type zeolite ion-exchanged at 3 weight % with Cu, with an average particle diameter of 2 μm, a silica/alumina ratio of 40, and a specific surface area of 110 m$^2$/g; 2600 g of alumina sol as a component including inorganic binder, with 20 weight % of a solids content; 780 g of an alumina fiber as an inorganic fiber with an average fiber diameter of 6 μm and an average fiber length of 100 μm; and 410 g of methyl cellulose as organic binder were mixed and kneaded to obtain a raw material paste. By impregnating the zeolite particles with a cupric nitrate aqueous solution, ions were exchanged with Cu. The amount of ion-exchange of zeolite was calculated by an IPC light emission analysis using an ICPS-8100 (manufactured by SHIMADZU CORPORATION). Then, the raw material paste was extruded by an extruder to obtain a raw cylindrical honeycomb molded body. After drying the honeycomb molded body by using a microwave drying apparatus and a hot air drying apparatus, the honeycomb molded body was degreased at 400° C. for 5 hours. Subsequently, the honeycomb molded body was fired at 700° C. for 5 hours, thereby the cylindrical honeycomb unit 11 with a diameter of 143.8 mm and a length of 150 mm was obtained. The honeycomb unit 11 had a cross-section vertical to the longitudinal direction, of which aperture ratio is 65%, a density of through-holes was 62 holes/cm$^2$, a partition wall thickness was 0.25 mm, and a content of zeolite per apparent unit volume was 250 g/L.

Here, the aperture ratio of the cross-section vertical to the longitudinal direction was obtained by calculating an area of the through-holes in a 10 cm$^2$ region of the honeycomb structure. The density of the through-holes was obtained by measuring the number of through-holes in the 10 cm$^2$ region of the honeycomb structure. Further, the thickness of the partition is an average value obtained by measuring the thickness (five points) of the partition wall of the honeycomb structure by using an optical microscope.

Next, 29 weight % of γ-alumina with an average particle diameter of 2 μm, 7 weight % of alumina fiber with an average fiber diameter of 6 μm and an average fiber length of 100 μm; 34 weight % of alumina sol with 20 weight % of solids content; 5 weight % of carboxymethyl cellulose; and 25 weight % of water were mixed to obtain the outer coating layer paste.

Further, the outer coating layer paste was uniformly applied over the outer surface (except for the end faces) of the honeycomb unit 11. Then, the applied paste was dried at 120° C., and degreased at 700° C. for 20 minutes. In this manner, the outer coating layer 14 with a thickness of 2 mm was formed, thereby the honeycomb structure 10 in a cylindrical shape was manufactured.

Then, the outer coating layer 14 of the honeycomb structure 10 was polished by using an emery paper so that the circularity of the end faces A and B became 1.5 mm and 2.5 mm respectively (see Table 1).

Examples 2 to 6 and Comparative Examples 1 to 3

The honeycomb structure 10 was manufactured similarly to Example 1 except that the polishing of the outer coating layer 14 was controlled so that the circularity of the end faces A and B were changed as shown in Table 1.

TABLE 1

| | Circularity [mm] | | Difference [mm] in circularity | |
|---|---|---|---|---|
| | End face A | End face B | between end faces A and B | Displacement test |
| Example 1 | 1.5 | 2.5 | 1.0 | Good |
| Example 2 | 2.5 | 4.0 | 1.5 | Good |
| Example 3 | 1.5 | 3.5 | 2.0 | Good |
| Example 4 | 2.5 | 1.5 | 1.0 | Good |
| Example 5 | 4.0 | 2.5 | 1.5 | Good |
| Example 6 | 3.5 | 1.5 | 2.0 | Good |
| Comparative Example 1 | 1.0 | 1.0 | 0 | Bad |
| Comparative Example 2 | 2.5 | 2.5 | 0 | Bad |
| Comparative Example 3 | 4.0 | 4.0 | 0 | Bad |

Note that the circularity of the end faces A and B were measured by using a roundness measuring instrument Roundtest RA736 (manufactured by Mitsutoyo Corporation). Differences in the circularity of the end faces A and B are shown in Table 1.

(Displacement Test)

Figure 4A:
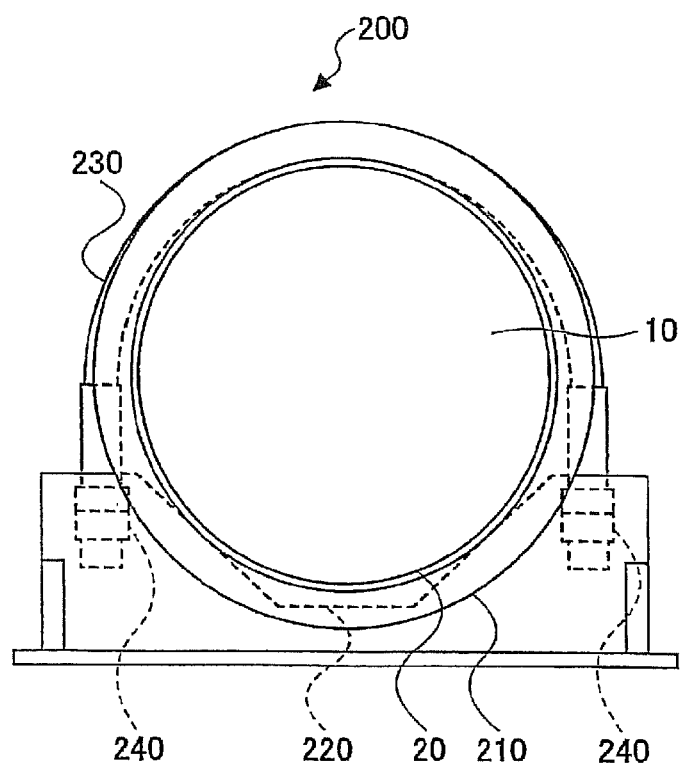
FIG. 4A is a front view of a vibration apparatus.
Figure 4B:
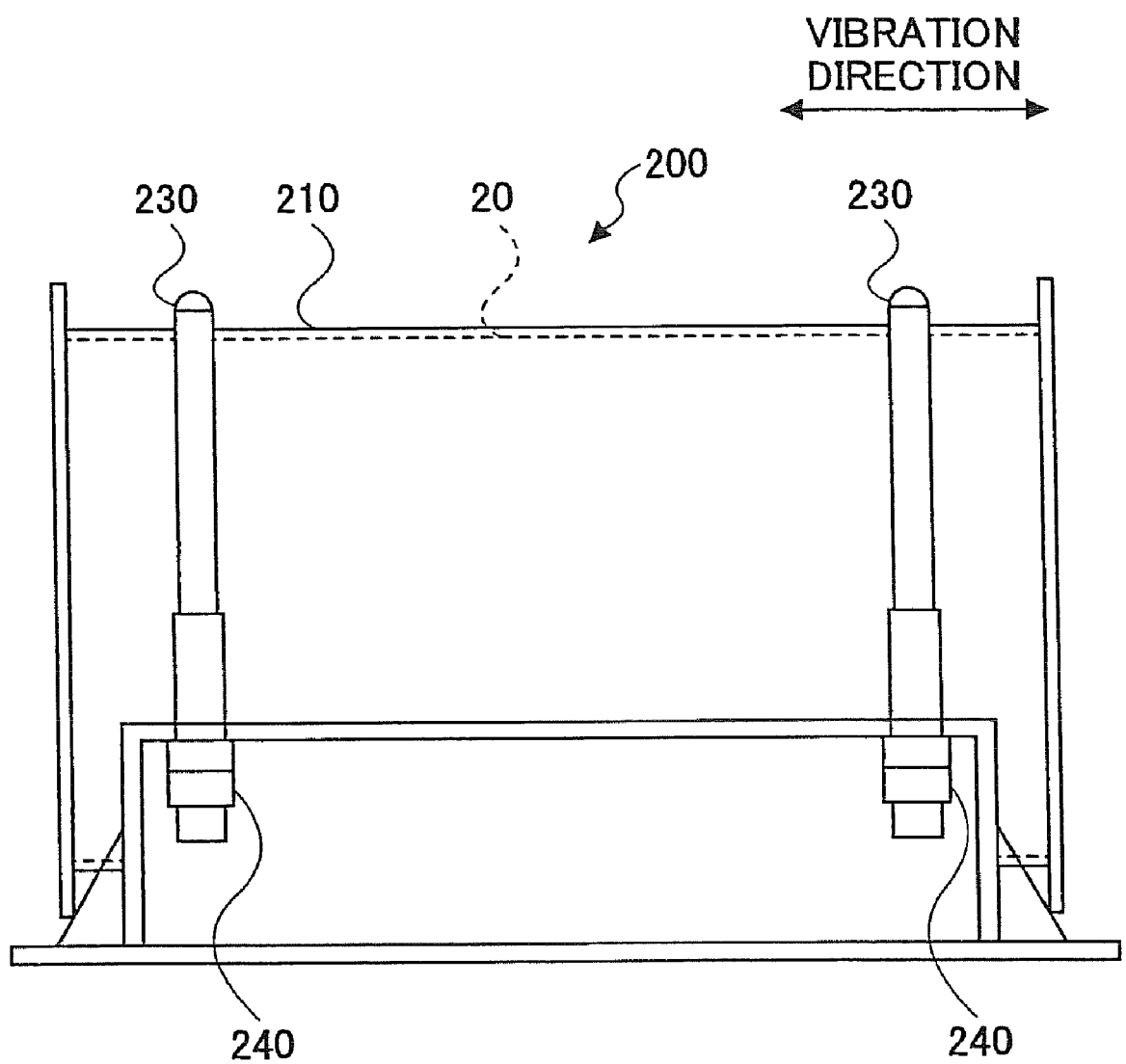
FIG. 4B is a side view of the vibration apparatus.

An alumina mat (46.5 cm×15 cm) with a thickness of 6 mm (manufactured by Mitsubishi Chemical Corporation) was provided as the holding sealing material 20 around the outer surface of the honeycomb structure 10. The honeycomb structure 10 was then put into a metal container 210 and pushed in by Instron to be housed. Then, the housed honeycomb structure 10 was fixed in a vibration apparatus 200 (see FIGS. 4A and 4B) so that the longitudinal direction of the honeycomb structure 10 became horizontal. The honeycomb structure 10 was then vibrated in the horizontal direction at a frequency of 160 Hz, an acceleration of 30 G, amplitude of 0.58 mm, at room temperature, and for a hold time of 120 hours. Then, displacement of the honeycomb structure 10 from a proper position was measured.

In the vibration apparatus 200, the metal container including the honeycomb structure 10 was placed on a stage 220. The metal container 210 was fixed by fixtures 230 in a general U-shape which were tightened by screws 240. In this manner, the metal container 210 could be vibrated with the stage 220 and the fixture 230 in an integrated manner.

Table 1 shows measurement results. When the displacement was less than 10 mm, "Good" is shown and when the displacement was 10 mm or more, "Bad" is shown. As shown in Table 1, displacements of the honeycomb structure 10 in Examples 1 to 6 were less than displacements of the honeycomb structure 10 of Comparative Examples 1 to 3.

As described above, when the end faces A and B of the honeycomb structure 10 have circularity of about 1.5 mm to about 4.0 mm and have different circularity, displacement of the honeycomb structure 10 from the metal container can be suppressed.

Obviously, numerous modifications and variations of the present invention are possible in light of the above teachings.

It is therefore to be understood that within the scope of the appended claims, the invention may be practiced otherwise than as specifically described herein.

What is claimed is:
1. A honeycomb structure comprising:
an inorganic particle;
inorganic binder;
a honeycomb unit comprising plural partition walls extending along a longitudinal direction of the honeycomb unit to define through-holes;
a first end face substantially perpendicular to the longitudinal direction and provided at a first end of the honeycomb structure; and
a second end face substantially perpendicular to the longitudinal direction and provided at a second end opposite to the first end in the longitudinal direction of the honeycomb structure, first circularity of the first end face and second circularity of the second end face being about 1.5 mm to about 4.0 mm, the circularity of the first end face being different from the circularity of the second end face, wherein an absolute value of a difference between the first circularity and the second circularity is about 1.0 mm to about 2.0 mm.

2. The honeycomb structure as claimed in claim 1, wherein the inorganic particle comprises at least one of alumina, silica, titania, zirconia, ceria, mullite, these precursors, and zeolite.

3. The honeycomb structure as claimed in claim 2, wherein the honeycomb unit includes about 230 g/L to about 270 g/L of the zeolite per apparent unit volume.

4. The honeycomb structure as claimed in claim 2, wherein the zeolite comprises at least one of β-type zeolite, Y-type zeolite, ferrierite, ZSM-5-type zeolite, mordenite, faujasite, zeolite A, and zeolite L.

5. The honeycomb structure as claimed in claim 2, wherein a mole ratio of alumina to silica in the zeolite is from about 30 to about 50.

6. The honeycomb structure as claimed in claim 2, wherein the zeolite is ion-exchanged with at least one of Fe, Cu, Ni, Co, Zn, Mn, Ti, Ag, and V.

7. The honeycomb structure as claimed in claim 2, wherein the zeolite includes a secondary particle with an average particle diameter of about 0.5 µm to about 10 µm.

8. The honeycomb structure as claimed in claim 1, wherein the inorganic binder comprises a solid content included in at least one of alumina sol, silica sol, titania sol, liquid glass, sepiolite, and attapulgite.

9. The honeycomb structure as claimed in claim 1, wherein the honeycomb unit further includes an inorganic fiber.

10. The honeycomb structure as claimed in claim 9, wherein the inorganic fiber comprises at least one of alumina, silica, silicon carbide, silica alumina, glass, potassium titanate, and aluminum borate.

11. The honeycomb structure as claimed in claim 1, further comprising a coating layer provided on an outer surface of the honeycomb structure.

12. The honeycomb structure as claimed in claim 1, wherein the honeycomb structure comprises a single honeycomb unit.

13. The honeycomb structure as claimed in claim 1, wherein the honeycomb structure comprises a plurality of honeycomb units which are adhered to each other with an adhesion layer provided between the plurality of honeycomb units.

14. The honeycomb structure as claimed in claim 1, wherein a cross-section substantially perpendicular to the longitudinal direction other than the first end face and the second end face has a substantially circle shape.

15. The honeycomb structure as claimed in claim 1, wherein the honeycomb structure has at least one part where a cross-section substantially perpendicular to the longitudinal direction has high circularity other than the first end face and the second end face.

16. An exhaust gas cleaning unit comprising;
A honeycomb structure comprising:
an inorganic particle;
inorganic binder;
a honeycomb unit comprising plural partition walls extending along a longitudinal direction of the honeycomb unit to define through-holes;
a first end face substantially perpendicular to the longitudinal direction and provided at a first end of the honeycomb structure; and a second end face substantially perpendicular to the longitudinal direction and provided at a second end opposite to the first end in the longitudinal direction of the honeycomb structure, first circularity of the first end face and second circularity of the second end face being about 1.5 mm to about 4.0 mm, the circularity of the first end face being different from the circularity of the second end face, wherein an absolute value of a difference between the first circularity and the second circularity is about 1.0 mm to about 2.0 mm;
a holding sealing material provided around an outer surface of the honeycomb structure; and
a metal container in which the honeycomb structure provided with the holding sealing material is provided.

17. The exhaust gas cleaning unit as claimed in claim 16, wherein the inorganic particle is at least one of alumina, silica, titania, zirconia, ceria, mullite, these precursors, and zeolite.

18. The exhaust gas cleaning unit as claimed in claim 17, wherein the honeycomb unit includes about 230 g/L to about 270 g/L of the zeolite per apparent unit volume.

19. The exhaust gas cleaning unit as claimed in claim 17, wherein the zeolite comprises at least one of β-type zeolite, Y-type zeolite, ferrierite, ZSM-5-type zeolite, mordenite, faujasite, zeolite A, and zeolite L.

20. The exhaust gas cleaning unit as claimed in claim 17, wherein a mole ratio of alumina to silica in the zeolite is from about 30 to about 50.

21. The exhaust gas cleaning unit as claimed in claim 17, wherein the zeolite is ion-exchanged with at least one of Fe, Cu, Ni, Co, Zn, Mn, Ti, Ag, and V.

22. The exhaust gas cleaning unit as claimed in claim 17, wherein the zeolite includes a secondary particle with an average particle diameter of about 0.5 µm to about 10 µm.

23. The exhaust gas cleaning unit as claimed in claim 16, wherein the inorganic binder comprises a solid content included in at least one of alumina sol, silica sol, titania sol, liquid glass, sepiolite, and attapulgite.

24. The exhaust gas cleaning unit as claimed in claim 16, wherein the honeycomb unit further includes an inorganic fiber.

25. The exhaust gas cleaning unit as claimed in claim 24, wherein the inorganic fiber comprises at least one of alumina, silica, silicon carbide, silica alumina, glass, potassium titanate, and aluminum borate.

26. The exhaust gas cleaning unit as claimed in claim 16, further comprising a coating layer provided on an outer surface of the honeycomb structure.

27. The exhaust gas cleaning unit as claimed in claim 16, wherein the honeycomb structure comprises a single honeycomb unit.

28. The exhaust gas cleaning unit as claimed in claim 16, wherein the honeycomb structure comprises a plurality of honeycomb units which are adhered to each other with an adhesion layer provided between the plurality of honeycomb units.

29. The exhaust gas cleaning unit as claimed in claim 16, wherein a cross-section substantially perpendicular to the longitudinal direction other than the first end face and the second end face has a substantially circle shape.

30. The exhaust gas cleaning unit as claimed in claim 16, wherein the honeycomb structure has at least one part where a cross-section substantially perpendicular to the longitudinal direction has high circularity other than the first end face and the second end face.

31. A manufacturing method of a honeycomb structure comprising a honeycomb unit comprising plural partition walls extending along a longitudinal direction of the honeycomb structure to define through-hole, the manufacturing method comprising:
   extruding a raw material paste including the organic particle and the inorganic binder to form a raw honeycomb molded body;
   drying the raw honeycomb molded body;
   degreasing the raw honeycomb molded body;
   firing the raw honeycomb molded body; and
   providing a first end face substantially perpendicular to the longitudinal direction at a first end of the honeycomb structure; and
   providing a second end face substantially perpendicular to the longitudinal direction at a second end opposite to the first end in the longitudinal direction, first circularity of the first end face and second circularity of the second end face being about 1.5 mm to about 4.0 mm, the circularity of the first end face being different from the circularity of the second end face, wherein an absolute value of a difference between the first circularity and the second circularity is about 1.0 mm to about 2.0 mm.

32. The manufacturing method as claimed in claim 31, wherein pressure or polishing is applied to an external wall of the raw honeycomb molded body so that the circularity of the first end face is different from the circularity of the second end face.

33. The manufacturing method as claimed in claim 31, further comprising:
   providing an outer coating layer paste on an outer surface of a honeycomb unit;
   drying and solidifying the outer coating layer paste to form an outer coating layer; and
   changing a thickness of the outer coating layer so that the circularity of the first end face is different from the circularity of the second end face.

34. The manufacturing method as claimed in claim 31, further comprising providing an adhesive between a plurality of honeycomb units to connect the plurality of honeycomb units.

35. The manufacturing method as claimed in claim 31, wherein the raw honeycomb molded body is fired at about 600° C. to about 1200° C.

36. The manufacturing method as claimed in claim 31, wherein the inorganic particle comprises at least one of alumina, silica, titania, zirconia, ceria, mullite, these precursors, and zeolite.

37. The manufacturing method as claimed in claim 36, wherein a mole ratio of alumina to silica in the zeolite is from about 30 to about 50.

38. The manufacturing method as claimed in claim 36, wherein the zeolite is ion-exchanged with at least one of Fe, Cu, Ni, Co, Zn, Mn, Ti, Ag, and V.

39. The manufacturing method as claimed in claim 36, wherein the zeolite includes a secondary particle with an average particle diameter of about 0.5 µm to about 10 µm.

40. The manufacturing method as claimed in claim 31, wherein the inorganic binder comprises a solid content included in at least one of alumina sol, silica sol, titania sol, liquid glass, sepiolite, and attapulgite.

41. The manufacturing method as claimed in claim 31, wherein the honeycomb unit further includes an inorganic fiber.

42. The honeycomb structure as claimed in claim 41, wherein the inorganic fiber comprises at least one of alumina, silica, silicon carbide, silica alumina, glass, potassium titanate, and aluminum borate.

* * * * *